United States Patent
Schmidt

[15] 3,666,065
[45] May 30, 1972

[54] SPEED RESPONSIVE TRANSMISSION

[72] Inventor: Charles T. Schmidt, North Riverside, Ill.

[73] Assignee: Borg-Warner Corporation, Chicago, Ill.

[22] Filed: July 17, 1970

[21] Appl. No.: 55,772

[52] U.S. Cl............192/103 A, 192/104 R, 192/105 C
[51] Int. Cl.........................................F16d 43/06
[58] Field of Search...............192/103 A, 104 R, 105 C

[56] References Cited

UNITED STATES PATENTS 2,162,873  6/1939  Wolfram.....................192/103 A
2,432,591  12/1947 Schuckers....................192/104 R Primary Examiner—Benjamin W. Wyche
Assistant Examiner—Randall Heald
Attorney—Donald W. Banner, William S. McCurry and John W. Butcher

[57] ABSTRACT

A speed responsive clutch is provided with shifting means including orbitally rotatable centrifugal flyweights and a lost motion connector. At a predetermined drive speed, the radius of rotation of the flyweights changes by means of the lost motion connector providing a change in energy level without corresponding change in drive speed. Rotation of an input member at a predetermined threshold speed of rotation results in outward movement of the flyweights without further increase in drive speed thereby increasing the energy level to provide a clutch release force. Rotation of the input member at another preselected reengagement speed of rotation results in inward movement of the flyweights without further reduction in drive speed thereby reducing the energy level to permit reengagement of the clutch. A substantial difference between the threshold and reengagement speeds can be provided for avoiding cyclic shifting of the clutch when operating near either speed.

4 Claims, 9 Drawing Figures

Patented May 30, 1972

INVENTOR.
Charles T. Schmidt
BY
Herman E. Smith
ATTORNEY

Patented May 30, 1972

INVENTOR.
Charles T. Schmidt
BY
Herman E. Smith
ATTORNEY

SPEED RESPONSIVE TRANSMISSION

SUMMARY OF THE INVENTION

The present invention relates generally to a transmission device and more particularly to speed sensitive shifting means therefor.

The improved shifting means according to the present invention provides positive shifting action at a preselected drive speed without requiring further change in drive speed to complete the shifting action, thus avoiding a reduction in torque capacity as the shifting speed is approached. The apparatus may be provided with two different shifting speeds such that downshift occurs at one speed and upshift occurs at another substantially different speed in order to avoid a tendency to cycle or hunt when the drive speed is varied slightly above and below the selected shifting speed.

Among the objects of the present invention is to provide a speed responsive shifting means capable of producing a complete shifting action in response to rotation of an input member at a predetermined speed without requiring further change in input speed to complete the shifting action; to provide a speed responsive clutch shifting device which avoids a reduction in torque capacity upon approaching the shifting speed; and to provide a shifting device which undergoes a change in effective kinetic energy level at a selected drive speed to define one or the other of two conditions as a function of drive speed. Other objects and advantages of the invention will become more readily apparent from consideration of the following description together with the accompanying drawings.

DESCRIPTION OF THE PREFERRED EMBODIMENT

A shifting device according to the present invention can be employed in a wide range of applications where it is desired to provide a positive shifting action in response to rotation of an input member at a selected speed. One example, of a desirable application is in a two-speed accessory drive for a motor vehicle where it is desirable to change the speed ratio of engine driven accessories in order to provide adequate operation at low engine speeds and to protect the accessories against overspeeding at high engine speeds. The invention is described hereinafter as embodied in such a two-speed accessory drive for providing a speed increasing drive ratio at low engine speeds and a speed reducing ratio at high engine speeds. When the engine speed is increased to a predetermined threshold speed of rotation, the shifting device undergoes an avalanche response which completely releases a clutch for providing a speed reducing ratio, which is then maintained until the engine speed is reduced to a second predetermined reengagement speed of rotation where a second avalanche response occurs in reverse order to completely reengage the clutch and reestablish the initial speed increasing drive ratio.

Figure 1:
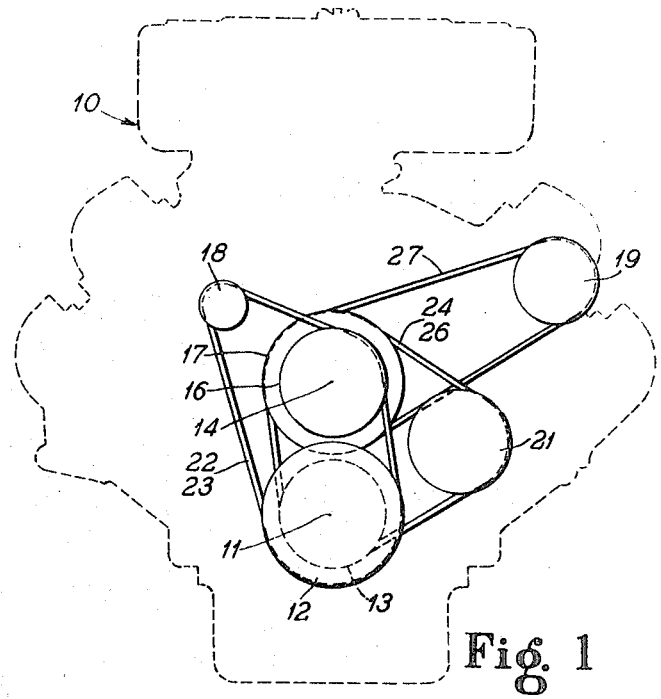
FIG. 1 is a schematic view of a belt driven arrangement for driving accessories from an engine providing an environment for the present invention.

Referring now to FIG. 1, a motor vehicle engine 10 is shown in broken lines having a drive shaft 11 upon which are mounted a pair of alternate output V-belt pulleys 12 and 13. A water pump and fan shaft 14 is mounted above the drive shaft and has a compound V-belt pulley 16, 17 mounted thereon. Other V-belt pulleys such as 18 for an alternator, 21 for a power steering pump, and 19 for a compressor are shown spaced from compound pulley 16, 17. A pair of V-belts 22, 23 extend about pulleys 12, 16 and 18, a second pair of V-belts 24, 26 extend about pulleys 13, 17 and 21, while a single V-belt 27 extends about pulleys 17 and 19. Thus the compound pulley 16, 17 for the fan and water pump, provides a common intermediate member connecting each of the accessories with the alternative drive pulleys 12 and 13.

Figure 2:
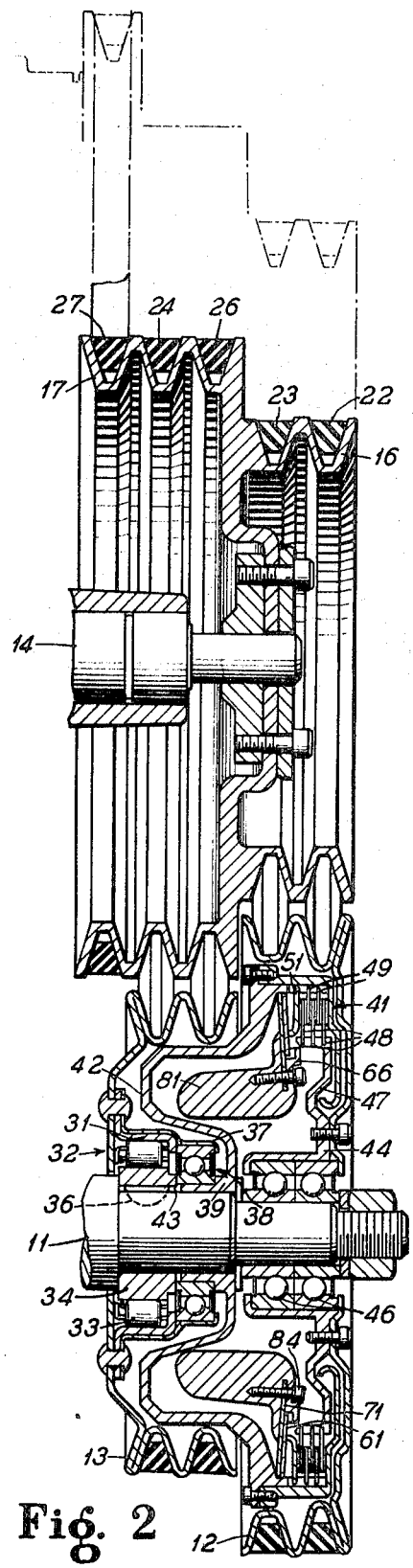
FIG. 2 is a section view of a transmission device according to the present invention.

As indicated more clearly in FIG. 2, the diameter of pulley 12 is greater than that of pulley 16 resulting in shaft 14 rotating faster than shaft 11 when pulley 12 is driving. The diameter of pulley 13 is less than that of pulley 17 resulting in shaft 14 rotating slower than shaft 11 when pulley 13 is driving. The slope of line portion 28 in FIG. 3 indicates the relative speed of shaft 14 with respect to shaft 11 when pulley 12 is driving and the slope of line portion 29 indicates the relative speeds when pulley 13 is driving. It is thus seen that the accessories are driven above engine speed when pulley 12 is driving and below engine speed when pulley 13 is driving.

Referring now to FIG. 2, the mounting of alternative drive pulleys 12 and 13 will be described in greater detail. Pulley 13 includes a hub portion 31 forming the outer race of a one way overrunning clutch 32 which includes a plurality of rollers 33 and an inner race 34. The inner race 34 is mounted on shaft 11 by means of a key 36 such that the inner race rotates with the shaft. As is well known in the art of one way overrunning clutches, the overrunning clutch provides a drive connection between the inner and outer races but permits the outer race to turn faster than the inner race. Thus the one way clutch 32 is able to drive pulley 13 at the speed of shaft 11 or permit the pulley 13 to rotate faster than shaft 11. The hub portion 31 of pulley 13 also includes an extension 37 engaging the outer race of an anti-friction bearing 38, which is mounted on a hub portion 39 of a friction clutch 41 which in turn is mounted on shaft 11. The bearing 38 thus provides support for pulley 13 when it is overrunning shaft 11.

Hub portion 39 of friction clutch drive member 42 is mounted on shaft 11 and keyed to the inner race 34 of overrunning clutch 32 by a tang portion 43. Thus the drive member 42 of friction clutch 41 is directly driven by shaft 11. A hub portion 44 of pulley 12 is rotatably mounted on shaft 11 by means of anti-friction bearings 46, 46 and forms part of the driven portion 47 of friction clutch 41.

Friction clutch 41 also includes a plurality of axially engageable friction discs 48, 49 providing a drive connection between the drive member 42 and driven portion 47. Friction discs 49 are keyed in drive member 42 while friction discs 48 are keyed in driven portion 47. A spring biased operating member 51 is provided for clamping the friction discs 48, 49 in driving engagement with each other.

When the friction discs 48, 49 are clamped in driving engagement with each other defining an engaged condition of clutch 41, shaft 11 directly drives pulley 12 through driving member 42, clutch 41 and driven portion 47. When pulley 12 drives pulley 16, the speed of shaft 14 and pulley 17 is greater than that of shaft 11 as a result of the different pulley diameters. Pulley 17 is connected to alternate drive pulley 13 by means of the V-belts 24, 26 and drives pulley 13 at a further increased speed, causing pulley 13 to overrun shaft 11 by means of the overrunning one way clutch 32 and bearing 38.

When friction discs 48, 49 are released from clamping engagement with each other, the drive connection between shaft 11 and pulley 12 is broken, allowing pulley 12 to free wheel on shaft 11 by means of bearings 46, 46. The accessories such as the alternator, water pump and the like, cause shaft 14 and compound pulley 16, 17 to decrease in speed until the speed of pulley 13 is reduced to the speed of shaft 11 after which pulley 13 is driven by shaft 11 through one way clutch 32. Thus when clutch 41 is engaged, pulley 12 functions as drive pulley providing a speed increasing drive ratio and when clutch 41 is released, pulley 13 functions as drive pulley providing a speed reducing drive ratio.

Referring now to FIGS. 2 through 9, the automatic speed responsive shifting mechanism for engaging and releasing clutch 41 in response to the speed of shaft 11 will be described in more detail.

A first clutch energizing diaphragm spring 61 has an outer portion 62 mounted in clutch drive member 42, and an inner portion 63 bearing against operating member 51. A plurality of inwardly extending finger portions 64 are arranged for delayed engagement with a lost motion connection 86. As shown in FIG. 2, spring 61 exerts a predetermined axial preload on operating member 51 and clutch discs 48, 49 for maintaining clutch 41 in engagement.

A second diaphragm biasing spring 71 is mounted axially adjacent first spring 61 having an outer portion 72 mounted in clutch drive member 42. A plurality of inwardly extending fingers 74 are formed on second spring 71 for receiving a plurality of flyweights 81. Flyweights 81 are provided with slots 82 and internal screw threads 83 for secure mounting on the fingers 74 by means of a cap screw 84. In addition, flyweights 81 are provided with a lost motion connector portion 86 including a slot portion 87 loosely receiving respective finger portions 64 of first diaphragm spring 61. The lost motion connector 86 is further defined by a lip portion 88 which becomes engaged with spring 61 after a predetermined separation of springs 71 and 61 as determined by the thickness of spring 61 and the length of the slot portion 87.

Flyweights 81 are thus mounted for orbital rotation about the axis of shaft 11 at the speed of clutch drive member 42. As a result of centrifugal force generated by rotation of shaft 11, the flyweights 81 exhibit a tendency to move axially and outwardly as permitted by deflection of spring 71. As flyweights 81 are allowed to move outwardly to orbits of greater radius, the centrifugal force for a given speed of rotation increases, which in turn results in a greater axial force tending to deflect the spring 71 even further in the axial direction. The biasing or control spring 71 and the lost motion connector 86 permit initial outward movement of flyweights 81 for increasing the effective kinetic energy thereof while the engaging spring 61 maintains the clutch 41 fully engaged. The increased kinetic energy resulting from initial movement of the flyweights provides a surplus axial force sufficient to deflect both the control spring 71 and the clutch engaging spring 61 when the lost motion connector becomes engaged with the clutch spring thus providing for quickly and completely releasing the clutch 41.

Figure 4:
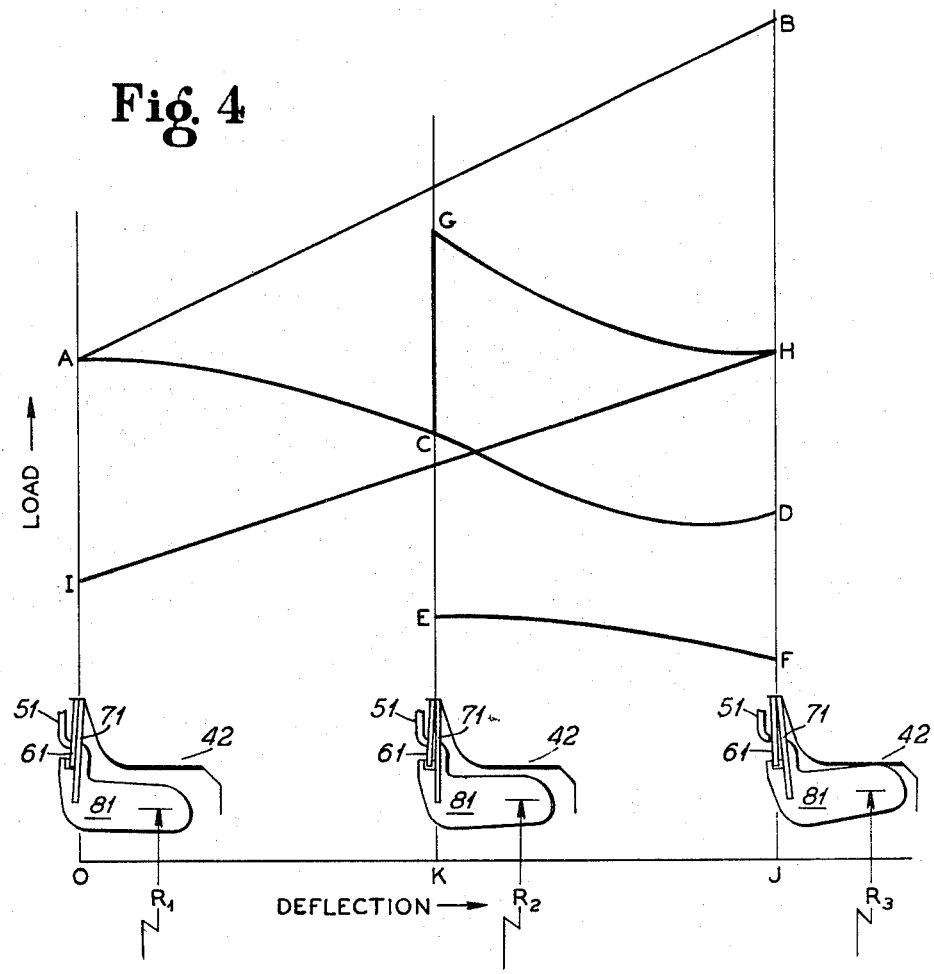
FIG. 4 is a graph showing the load-deflection relationships of elements of the present invention.
Figure 6:
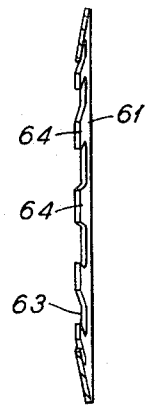
FIGS. 5 and 6 are views of a diaphragm engaging spring employed in the present invention.
Figure 5:
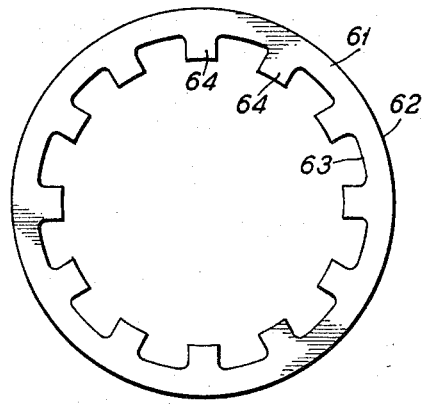
Figure 7:
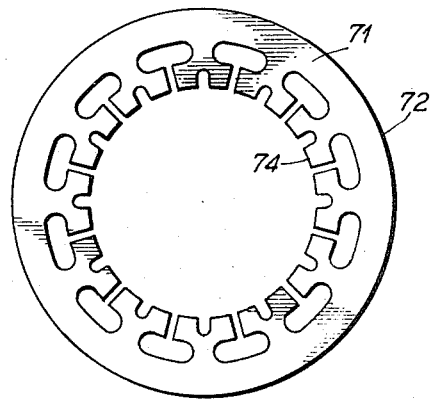
FIGS. 7 and 8 are views of a diaphragm operating spring employed in the present invention.
Figure 8:
Figure 9:
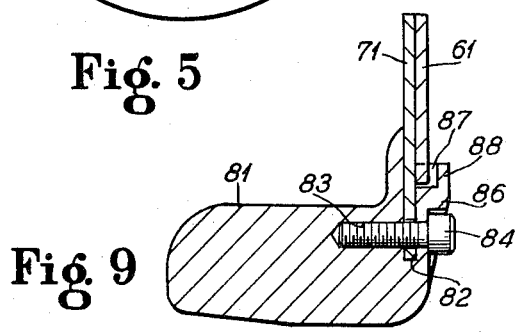
FIG. 9 is a fragmentary view to enlarged scale showing the cooperation of the engaging spring and operating spring with the flyweights.

Referring now to the load-deflection graph of FIG. 4, the characteristics of the springs 61 and 71 will be described in greater detail. In the graph of FIG. 4, vertical distance represents load and horizontal distance represents deflection. The vertical line segment O-A represents the axial bias exerted by spring 71 on flyweights 81 urging the flyweights to remain in an inner orbit of rotation of minimum radius as shown in FIG. 2. The line segment A-B represents the increasing axial force generated by rotation of flyweights 81 at a constant threshold speed of rotation while moving axially and therefore outwardly to orbit at greater radii of rotation. Thus the initial axial bias of spring 71 and the characteristics of flyweights 81 are selected to define a desired threshold speed of rotation at which clutch release is desired.

The line segment ACD represents a desirable deflection rate for spring 71. As shown, the deflection rate of spring 71 is substantially negative throughout its entire range of deflection, however, the deflection rate may be varied in combination with the characteristics of spring 61 to define a desired reengagement speed of the clutch. It is desirable that the spring 71 possess a negative deflection rate in the initial range of deflection represented by the line segment AC, the terminal portion of deflection represented by line segment CD being subject to modification to determine a desired reengagement speed.

The line segment EF represents the load-deflection rate for spring 61 which is nearly flat or constant rate throughout its range of deflection. The line segment GH represents the summation of the axial resistance of both springs 61 and 71 during release of the clutch. Thus the line segments ACGH represent the axial resistance encountered by the flyweights 81 which is always less than the axial disengaging force provided by the flyweights, as represented by the constant threshold speed line AB. Thus, once the threshold speed is reached the clutch becomes completely disengaged.

The line segment JH represents the total axial resistance of the two springs after full deflection and therefore indicates the axial resistance exhibited on the flyweights 81 in their outermost orbital position. The line segment HI represents the axial force resulting from the rotation of the flyweights at a constant reengagement speed which is substantially less than the threshold speed. The line HI is always below the line HGCA indicating that once the input speed has dropped to the reengagement speed the clutch must become reengaged.

The horizontal line segment KJ represents the range of deflection of the spring 61, while the line segment OKJ represents the range of deflection of the spring 71. The point O represents a first axial position of spring 71 in which the flyweights 81 are biased for rotation in an inner orbit having a radius $R_1$. The point K represents a second deflected position of spring 71 in which the slack in the lost motion connector is taken up and the flyweights have moved outwardly to an intermediate orbit having a radius $R_2$. The point J represents a third axially deflected position of spring 71 in which both springs 61 and 71 have been fully deflected and the flyweights are rotating in an outer orbit at a radius $R_3$. It is preferred to limit the radius of the outermost orbit of the flyweights to define an effective kinetic energy level consistant with the desired reengagement speed and the load-deflection characteristics of springs 61 and 71 as represented by line segment JH. The outermost orbit of the flyweights can be determined by contact between the flyweights and the drive member 42 as indicated in the right hand portion of FIG. 4.

Figure 3:
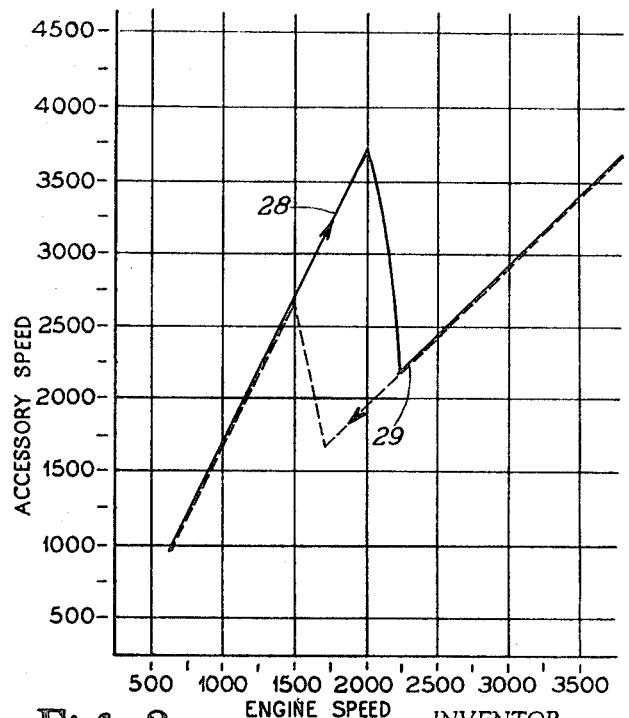
FIG. 3 is a graph showing the relation of engine and accessory speeds afforded by the transmission of the present invention.

Referring now to FIG. 3, the operation of the shifting device will be described in terms of a typical example as embodied in the two-speed accessory drive transmission. In FIG. 3, horizontal distance represents engine speed as exhibited by the input shaft 11 and vertical distance represents accessory speed as exhibited by the shaft 14. The graph shows the relationship of input and output speeds as the input shaft speed is increased from idle to about 4,000 RPM and returned to idle again. As the input speed is increased from idle to a threshold speed of 2,000 RPM, the accessory shaft 14 is driven by pulley 12 at a speed increasing ratio as represented by the line portion 28. At the threshold speed, the flyweights swing outwardly for orbital rotation at greater radii of rotation exerting an axial disengaging force on springs 61, 71 such that the clutch 41 is immediately released. The accessory shaft then slows until it is driven by the pulley 13 at a speed reduction ratio indicated by the line portion 29.

As the speed of the input shaft 11 is reduced from approximately 4,000 RPM, the accessory shaft 14 is driven by the pulley 13 at the speed reducing ratio represented by line portion 29 until a reengagement speed of approximately 1,540 RPM is reached. When the reengagement speed is reached, the kinetic energy of the flyweights is balanced by the resistance of the springs 61 and 71. The counterweights are moved inwardly for inner orbital rotation which further reduces their centrifugal effect allowing spring 61 to immediately reengage the clutch 41. Upon reengagement of clutch 41, the accessory shaft 14 becomes driven by pulley 12 at a speed increasing ratio as indicated by line portion 28 until the input shaft speed is reduced to idle.

It has been found that once the threshold speed is reached, the outward acceleration of the flyweights is greater than practical deceleration rates of the input drive shaft 11, thus the clutch becomes disengaged upon reaching the threshold speed even though the operator immediately reduces the speed. In a similar way, orbital collapse of the flyweights occurs in a very short time interval once the drive speed is reduced to the reengagement speed resulting in reengagement of the clutch even though the operator immediately increases the speed. Upon reaching the threshold speed, the clutch becomes immediately fully disengaged avoiding a condition of partial engagement in which slipping of the clutch friction members would result in wear and reduction of torque capacity. After disengagement, the clutch remains fully disengaged until the drive speed is reduced to the reengagement speed. Where the load deflection rates of springs 61 and 71 and the outermost orbit of the flyweights is selected to provide a substantial difference between the threshold speed and reengagement speeds, the drive shaft can be operated at speeds which vary above and below either speed without corresponding shifting of the clutch. In order to result in shifting of the clutch, the variation in drive speed must be at least as great as the difference between threshold and reengagement speeds.

What is claimed is:

1. A transmission mechanism including rotary input and output members, an axially engageable friction clutch providing a drive connection therebetween, and shifting means for regulating engagement and release of said clutch in response to rotational speed of said input member, said shifting means comprising:

a first clutch energizing diaphragm spring mounted in said rotary input member and arranged for exerting an axial preload on said clutch in an engaging direction defining an engaged condition of said clutch, said first spring being axially deflectable in an opposite direction for removing said preload from said clutch;

a second biasing diaphragm spring mounted adjacent said clutch spring having a plurality of centrifugal flyweights mounted thereon, said biasing spring exerting an initial axial bias on said flyweights in said engaging direction defining a preselected threshold speed of rotation, said flyweights being secured to said bias spring for movement therewith and having connector means including an engaging portion arranged for delayed engagement with said clutch spring;

said flyweights being movable axially and outwardly in response to rotation of said input member at said threshold speed for increasing the energy level thereof without increase in rotational speed, said flyweights deflecting said biasing spring independently of said clutch spring during movement from an inner to an intermediate orbital path, and deflecting both said biasing spring and said clutch spring for removing said preload from said clutch during movement from said intermediate orbital path to an outer orbital path.

2. A transmission mechanism according to claim 1 in which said biasing spring is provided with a substantially negative load-deflection rate for deflection independently of said clutch spring.

3. A transmission mechanism according to claim 1 in which said clutch spring is provided with a substantially constant load-deflection rate throughout its range of deflection.

4. A transmission mechanism according to claim 1 in which outer radial movement of said flyweights is limited to define a preselected radius of said outer orbital path, rotation of said flyweights in said outer orbital path at a preselected reengagement speed of rotation of said input member substantially less than said threshold speed of rotation, defining an energy level providing a force in said releasing direction equal to the sum of the axial bias of said clutch and biasing springs when fully deflected.

* * * * *